US012600360B2

(12) United States Patent
Kim

(10) Patent No.: US 12,600,360 B2
(45) Date of Patent: Apr. 14, 2026

(54) VEHICLE AND METHOD OF CONTROLLING THE SAME

(71) Applicant: HYUNDAI MOBIS CO., LTD., Seoul (KR)

(72) Inventor: Nam Soo Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 258 days.

(21) Appl. No.: 18/448,241

(22) Filed: Aug. 11, 2023

(65) Prior Publication Data

US 2024/0059297 A1 Feb. 22, 2024

(30) Foreign Application Priority Data

Aug. 19, 2022 (KR) ........................ 10-2022-0104191

(51) Int. Cl.
*B60W 40/072* (2012.01)
*B60W 60/00* (2020.01)
*G06V 20/56* (2022.01)

(52) U.S. Cl.
CPC ........ *B60W 40/072* (2013.01); *B60W 60/001* (2020.02); *G06V 20/588* (2022.01); *B60W 2420/403* (2013.01)

(58) Field of Classification Search
CPC ............. B60W 40/072; B60W 60/001; B60W 2420/403; G06V 20/588
USPC .......................................................... 701/23
See application file for complete search history.

(56) References Cited

U.S. PATENT DOCUMENTS

| | | | | |
|---|---|---|---|---|
| 2019/0113925 | A1* | 4/2019 | Sim ...................... | G06V 20/588 |
| 2019/0202453 | A1* | 7/2019 | Farooqi ............... | B60W 40/112 |
| 2020/0174476 | A1* | 6/2020 | Hasberg ............... | G05D 1/0257 |
| 2020/0400439 | A1* | 12/2020 | Thompson ......... | G01C 21/3697 |
| 2023/0109155 | A1* | 4/2023 | Takehara ............. | B62D 15/025 |
| | | | | 701/26 |
| 2023/0122011 | A1* | 4/2023 | Ishimaru .............. | G06V 20/588 |
| | | | | 348/148 |
| 2023/0236021 | A1* | 7/2023 | Ninomiya .............. | G01C 21/30 |
| | | | | 701/446 |

FOREIGN PATENT DOCUMENTS

JP          2006172225 A   *   6/2006

OTHER PUBLICATIONS

Kluge, Extracting road curvature and orientation from image edge points without perceptual grouping into features, Oct. 26, 1994, IEEE, Proceedings of the Intelligent Vehicles '94 Symposium (Year: 1994).*

* cited by examiner

*Primary Examiner* — Matthias S Weisfeld
(74) *Attorney, Agent, or Firm* — NSIP Law

(57) ABSTRACT

An apparatus and method of controlling a vehicle are provided. The method includes determining whether the vehicle is being driven in a predetermined section of a road, outputting forward image information by a camera, comparing a sensed curvature on a driving lane measured through the forward image information with a map curvature of the driving lane included in map information of a navigation system while the vehicle is in the predetermined section, and applying the sensed curvature or the map curvature to a steering control curvature based on the comparison result.

18 Claims, 3 Drawing Sheets

FIG. 1

VEHICLE AND METHOD OF CONTROLLING THE SAME

CROSS-REFERENCE TO RELATED APPLICATION(S)

The present application claims priority to Korean Patent Application No. 10-2022-0104191, filed on Aug. 19, 2022, the entire contents of which are incorporated herein for all purposes by this reference.

BACKGROUND

1. Field

The present disclosure relates to a vehicle and a method of controlling the vehicle that performs steering control according to lane lines of a driving lane.

2. Description of Related Art

Advanced Driver Assistance Systems (ADAS) is a technology that controls mechanical devices inside a vehicle by detecting and determining some of the numerous situations that may occur during driving, and related functions are being developed in the direction of autonomous driving ultimately.

The ADAS function includes Lane Following Assist (LFA) and Lane Keeping Assist (LKA) which help the vehicle not to cross the lane lines of its driving lane. To perform these functions, the vehicle detects lane lines of driving lanes using a forward camera and performs steering control by adjusting the rotation angle of the steering wheel according to the detected lane lines of driving lanes.

Accurate detection of the lane lines of driving lanes is important to perform steering control properly, but the diversity of the road environment may lead to problems where the vehicle misidentifies lane lines of driving lanes. For example, when a vehicle passes through a junction on an expressway and misidentifies the lane lines of a branching road for lane lines of a driving lane at the junction, improper steering control may be performed.

The matters described above as background technology are intended to provide a better understanding of the background of the present disclosure and should not be considered as acknowledging that the present disclosure pertains to the art already known to those skilled in the art.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the disclosure includes a method of controlling a vehicle. The method includes determining whether the vehicle is being driven in a predetermined section of a road, outputting forward image information by a camera, comparing a sensed curvature on a driving lane measured through the forward image information with a map curvature of the driving lane included in map information of a navigation system while the vehicle is in the predetermined section, and applying the sensed curvature or the map curvature to a steering control curvature, or a combination thereof based on the comparison result.

The applying may include applying the map curvature to a steering control curvature in response to the sensed curvature differing from the map curvature by a predetermined value or more and applying the sensed curvature to the steering control curvature in response to the sensed curvature differing from the map curvature by less than the predetermined value.

The applying of the map curvature may include converting the sensed curvature applied to the steering control curvature under the limit of predetermined curvature change rate into the map curvature.

The applying of the map curvature may be performed to apply the map curvature stored in a buffer before the vehicle enters the predetermined section to the steering control curvature.

The method may further include determining whether the difference between sensed curvatures for each of lane lines on both sides of the driving lane exceeds a threshold value in response to the vehicle being driven in the predetermined section, wherein the comparing is performed in response to the difference between the sensed curvatures being equal to the threshold value or less.

The method may further include selecting and applying the sensed curvature for either one of the lane lines on both sides of the driving lane to the steering control curvature in response to the difference between the sensed curvatures exceeding the threshold value.

The predetermined section may correspond to a road branching section, and the selecting and applying include selecting the sensed curvature for the lane line located opposite a branching road among the lane lines on both sides of the road branching section.

The predetermined section may correspond to a road branching section, and the method may further include determining whether the vehicle is being driven in the road branching section, and the determining of whether the vehicle is being driven in the road branching section may include determining whether the driving lane is an outermost lane of the road, determining whether the vehicle has entered the road branching section in response to the determination that the driving lane is the outermost lane, and determining whether the vehicle has passed the road branching section in response to the vehicle entering the road branching section.

The determining of whether the driving lane is the outermost driving lane may include determining whether either one lane line of the lane lines on both sides of the driving lane has a property of prohibiting lane changes, measuring road edge distance between the lane line having the property of prohibiting lane changes and a road edge of the road, and determining whether the driving lane is the outermost driving lane in response to the road edge distance being equal to a predetermined distance.

The different predetermined distances may apply according to whether the road is an expressway or an interstate highway.

The determining of whether the vehicle has entered the road branching section may include determining whether the vehicle has entered a road branching section after moving a predetermined distance in response to the link information of the road included in the map information indicating that there is a road branching section within the predetermined distance ahead of the vehicle.

The determining of whether the vehicle has passed the road branching section may include determining whether the vehicle has passed the road branching section in response to the link information of the road included in the map information indicating that there is no road branching section with a predetermined distance ahead of the vehicle.

The determining of whether the vehicle has passed the road branching section may include measuring road edge distance between the lane line having the property of prohibiting lane changes and the road edge of the road, and determining that the vehicle has passed the road branching section in response to the current measurement value of the road edge distance differing from the average value of the road edge distance measured before entering the road branching section by a predetermined value or less.

In another aspect of the disclosure, a non-transitory computer-readable recording medium having recorded thereon at least one program including commands, which, when executed by a computer, performs a method of controlling a vehicle according any of the methods above, is disclosed.

In yet another aspect of the disclosure, a vehicle is disclosed. The vehicle includes a camera outputting forward image information, a navigation system outputting map information, and a controller including a processor to determine whether the vehicle is being driven in a predetermined section of a road, compare sensed curvature of a driving lane measured through the forward image information with a map curvature of the driving lane included in map information in response to the vehicle being driven in the predetermined section, and apply at the sensed curvature or the map curvature to a steering control curvature based on a comparison result.

The processor may apply the map curvature to the steering control curvature in response to the sensed curvature differing from the map curvature by a predetermined value or more and apply the sensed curvature to the steering control curvature in response to the sensed curvature differing from the map curvature by the predetermined value or less.

The processor may determine whether the difference between the sensed curvatures for each of the lane lines on both sides of the driving lane exceeds a threshold value in response to the vehicle being driven in the predetermined section, and compare the sensed curvature with the map curvature in response to the difference between the sensed curvatures being equal to the threshold value or less.

The processor may select the sensed curvature for either one of the lane lines on both sides of the driving lanes and apply the selected sensed curvature to the steering control curvature in response to the difference between the sensed curvatures exceeding the threshold value.

The predetermined section may correspond to a road branching section, and the processor may select the sensed curvature for the lane line located opposite the branching road among the lane lines on both sides in the road branching section.

The predetermined section may correspond to a road branching section, and the processor may determine whether the vehicle is being driven in the road branching section by sequentially determining whether the driving lane is the outermost driving lane of the road, whether the vehicle has entered the road branching section, and whether the vehicle has passed the road branching section.

BRIEF DESCRIPTION OF THE DRAWINGS

FIG. 1 is a block diagram showing a configuration of a vehicle according to an embodiment of the present disclosure.

DETAILED DESCRIPTION

Figure 2:
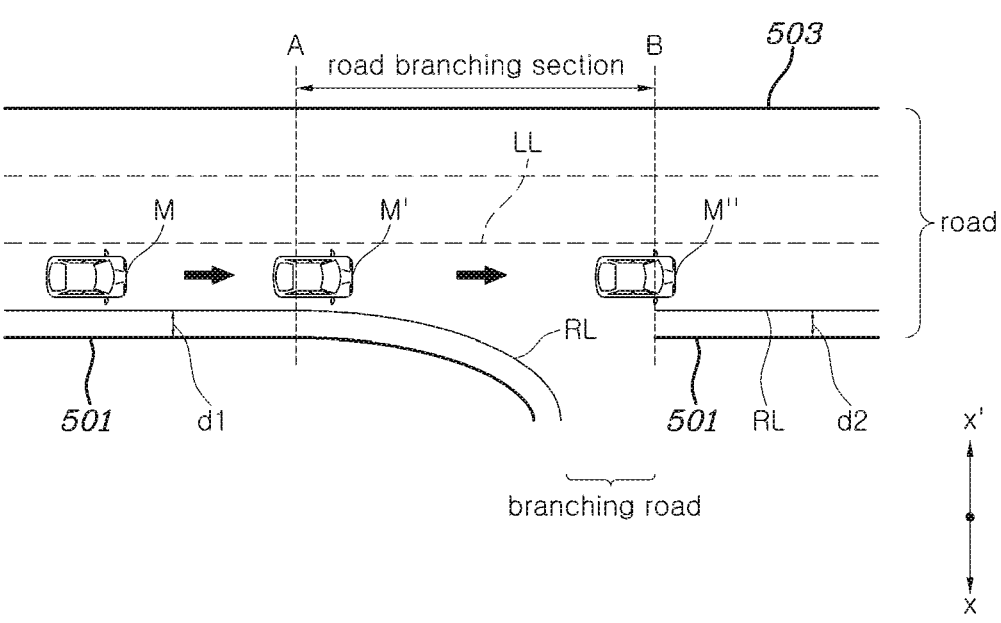
FIG. 2 is a view describing a process in which a vehicle identifies driving lane lines according to an embodiment of the present disclosure.

The embodiments disclosed herein will be described in detail with reference to the accompanying drawings. However, the same or similar components will be given the same reference numerals regardless of the drawing numbers, and the repetitive descriptions regarding these components will be omitted.

When it is determined that the specific description of the related and already known technology may obscure the essence of the embodiments disclosed herein, the specific description will be omitted. Further, it is to be understood that the accompanying drawings are only intended to facilitate understanding of the embodiments disclosed herein and are not intended to limit the technical ideas disclosed herein are not limited to the accompanying drawings and include all the modifications, equivalents, or substitutions within the spirit and technical scope of the present disclosure.

The terms including ordinal numbers such as first, second, and the like may be used to describe various components, but the components are not to be limited by the terms. The terms may only be used for the purpose of distinguishing one component from another.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

Further, a unit or a control unit included in the names such as a motor control unit (MCU), a hybrid control unit (HCU), and the like is a term widely used in the naming of controllers that control specific functions of a vehicle and does not mean a generic function unit. A controller may include a communication device that communicates with other controllers or sensors to control functions it is charged with, a memory for storing an operating system, logic commands, input and output information, and the like, and one or more processors performing functions such as decision-making, calculation, determination, and the like required for controlling the functions with which it is charged.

Figure 1:
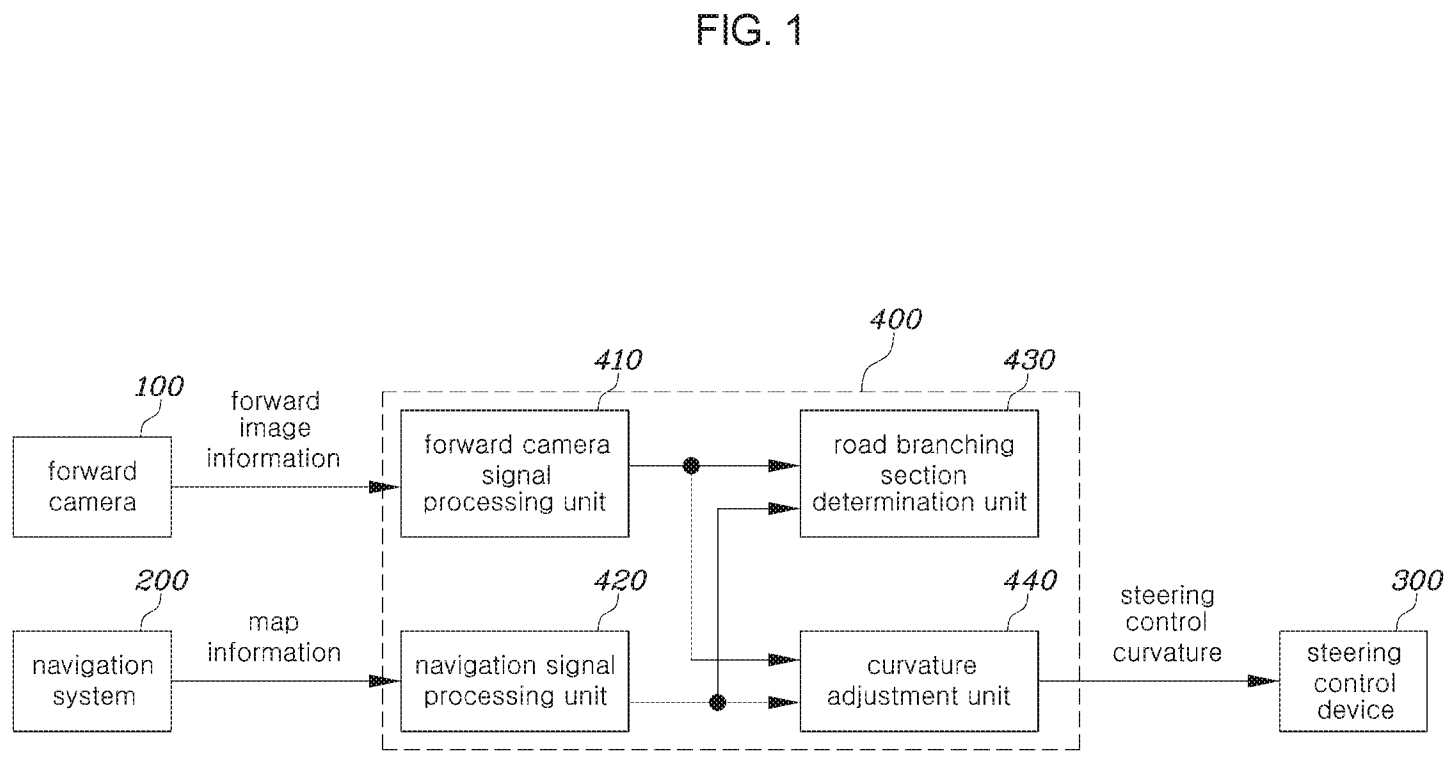

FIG. 1 is a block diagram showing a configuration of a vehicle according to an embodiment of the present disclosure. According to the present embodiment, the vehicle may be implemented as a vehicle equipped with advanced driver assistance systems (ADAS) or an autonomous driving system.

The vehicle shown in FIG. 1 may include a forward camera 100, a navigation system 200, a steering control device 300, and a controller 400.

The forward camera 100 may output forward image information through a field of view formed towards the front (or front sides) of the vehicle. The forward image information may include images of the lane lines (right lane line and left lane line) on both sides of the driving lane and the road edge of the road in which the vehicle is driving.

The navigation system 200 may output map information based on the location of the vehicle. For example, the map information may include information about the type of road the vehicle is driving (expressway, general national highway, etc.), the number of lanes on the road, link information of the road, and map curvature of the driving lane.

The link information of the road may include information about whether there are branching roads such as highway junctions, interchanges, and carpool-only lanes of the expressway within a certain distance ahead of the vehicle.

The information about the map curvature of the driving lane may include information about the curvature of the driving lane within a predetermined distance ahead of the vehicle.

The navigation system 200 may be implemented in general as a widely known audio, video, navigation, and telematics (AVNT) terminal but is not necessarily limited thereto.

The steering control device 300 may perform steering control of the vehicle by adjusting the rotation angle of a steering wheel and the like based on steering control curvature. For example, the steering control device 300 may receive measurement data from a vehicle speed sensor, a steering angle sensor, a yaw rate sensor, and the like, determine the current steering state of the vehicle, and control the steering device including the steering wheel based on the determination result.

The configuration and operation method of the controller 400 that determines whether the vehicle has misidentified the lane lines of the driving in which lane the vehicle is driving based on the forward image information and the map information and adjusts steering control curvature according to the determination result will be described below.

When the vehicle is driving in a predetermined section, the controller 400 may determine whether the driving lane lines are misidentified based on the forward image information and the map information. Here the predetermined section is a section in which driving lane lines are likely to be misidentified and may be in various ways according to embodiments. The present embodiment will be described on the assumption that the predetermined section corresponds to a road branching section.

The controller 400 may include a forward camera signal processing unit 410, a navigation signal processing unit 420, a road branching section determination unit 430, and a curvature adjustment unit 440. The controller 400 may be implemented as an ADAS controller or an autonomous driving controller.

The forward camera signal processing unit 410 may process and convert an image included in the forward image information output from the forward camera 100 and output the converted image to the road branching section determination unit 430 and the curvature adjustment unit 440.

At this time, the forward camera signal processing unit 410 may measure the curvature for each of the lane lines on both sides of the driving lane through the forward image information and output the measurement result to the curvature adjustment unit 440 as sensed curvatures.

The navigation signal processing unit 420 may process and convert the map information output from the navigation system 200 and output the converted information to the road branching section determination unit 430 and the curvature adjustment unit 440.

At this time, the navigation signal processing unit 420 may output the map curvature of the driving lane included in the map information to the curvature adjustment unit 440.

The road branching section determination unit 430 may determine whether the vehicle is driving on a road branching section based on the forward image information and the map information. To this end, the road branching section determination unit 430 may sequentially determine whether the vehicle is driving in the outermost lane of the road, whether the vehicle has entered the road branching section, and whether the road branching section has passed.

First, the road branching section determination unit 430 may determine through the forward image information whether at least one lane line of the lane lines (right lane line and left lane line) on both sides of the driving lane has the property of prohibiting lane changes. For example, a solid line or a double solid line corresponds to the lane line that prohibits lane changes.

When a lane line of the lane lines on both sides of the driving lane has the property of prohibiting lane changes, the road branching section determination unit 430 may measure a road edge distance through the forward image information and determine whether the driving lane is the outermost lane of the road according to whether the measured road edge distance is equal to a predetermined distance or less. In other words, the road branching section determination unit 430 may determine that the driving lane is the outermost lane of the road when the road edge distance is equal to a predetermined distance or less.

At this time, the road edge distance may be set to a distance between a lane line having the property of prohibiting lane changes and the road edge of the road, and different predetermined distances may apply according to the type of road, i.e., whether the road is an expressway or a general national highway.

However, when the number of lanes of the road included in the map information corresponds to "1", the road branching section determination unit 430 may determine that the driving lane is the outermost lane without determining the property of the lane line and the road edge distance.

When it is determined that the driving lane is the outermost lane, the road branching section determination unit 430 may determine whether the vehicle has entered the road branching section based on the map information.

More specifically, when the link information of the road included in the map information indicates that there is a road branching section within a predetermined distance ahead of the vehicle, the road branching section determination unit 430 may determine the vehicle has entered the road branching section after moving the predetermined distance.

When it is determined that the vehicle has entered the road branching section and the link information of the road included in the map information indicates that there is no road branching section within a predetermined distance ahead of the vehicle, the road branching section determination unit 430 may determine that the vehicle has passed the road branching section.

Further, when it is determined that the vehicle has entered the road branching section and the current measurement value of the road edge distance differs from the average value of the road edge distance measured before entering the road branching section by less than a predetermined value, the road branching section determination unit 430 may determine that the vehicle has passed the road branching section.

As a result, the road branching section determination unit 430 may determine that the vehicle is driving in the road branching section from the time the vehicle enters the road branching section to the time the vehicle leaves the road branching section. When it is determined that the vehicle is driving in the road branching section, the road branching section determination unit 430 may transmit the determination result to the curvature adjustment unit 440.

The curvature adjustment unit 440 may receive sensed curvature of the driving lane measured through the forward image information and map curvature of the driving lane included in the map information, determine whether the lane lines of the driving lane are misidentified based on the sensed curvature of the driving lane and the map curvature when the vehicle is driving in the road branching section, and adjust the steering control curvature.

First, when the vehicle is driving in the road branching section, the curvature adjustment unit 440 may determine whether the lane lines of the driving lane are misidentified according to whether the difference between the sensed curvatures for each of the lane lines (right lane line and left lane line) on both sides of the driving lane exceeds a threshold value. Various threshold values may be set according to embodiments.

When the difference between the sensed curvatures exceeds the threshold value, the curvature adjustment unit 440 may determine that the lane lines of the branching road are misidentified as lane lines of the driving lane and apply the sensed curvature for either lane line of the lane lines on both sides of the driving lane to the steering control curvature. In this case, the curvature adjustment unit 440 may select the sensed curvature for the lane line, of the lane lines on both sides of the driving lane, located opposite the branching road (that is, away from the branching road in the direction of the vehicle) in the road branching section.

On the other hand, even when the difference between the sensed curvatures of the driving lane is less than the threshold value, it may be determined that the lane lines of the driving lane are misidentified. As a result, the curvature adjustment unit 440 may determine again whether the driving lane is misidentified based on a comparison between the sensed curvature of the driving lane and the map curvature of the driving lane.

More specifically, when the difference between the sensed curvatures of the driving lane is equal to the threshold value of less, the curvature adjustment unit 440 may compare the sensed curvature of the driving lane measured through the forward image information with the map curvature of the driving lane included in the map information and apply the sensed curvature or the map curvature to the steering control curvature based on the comparison result.

When the sensed curvature of the driving lane differs from the map curvature of the driving lane by less than the predetermined value, the curvature adjustment unit 440 may determine the lane lines of the driving lane to be normal and apply the sensed curvature to the steering control curvature. Here, the predetermined value may be set in various ways according to embodiments.

When the sensed curvature of the driving lane differs from the map curvature of the driving lane by the predetermined value or more, the curvature adjustment unit 440 may determine that the lane lines of the branching road are misidentified for lane lines of the driving lane and apply the map curvature to the steering control curvature.

At this time, the curvature adjustment unit 440 may prevent the behavior of the vehicle from becoming unstable caused by the difference between the sensed curvature and the map curvature by converting the sensed curvature applied to the steering control curvature under the limit of predetermined curvature change rate into the map curvature.

Further, the curvature adjustment unit 440 may reduce the delay time caused by converting the sensed curvature applied to the steering control curvature to the map curvature by storing in a buffer the map curvature of the driving lane within a predetermined distance ahead of the vehicle before the vehicle enters the road branching section and applying the map curvature stored in the buffer to the steering control curvature.

FIG. 2 is a view describing a process in which a vehicle identifies lane lines of a driving lane according to an embodiment of the present disclosure.

FIG. 2 shows that a vehicle M may have the configuration described above with reference to FIG. 1. A vehicle M' represents the vehicle M passing the entry point A of the road branching section, and a vehicle M" represent the vehicle M passing the exit point B of the road branching section.

The number of lanes of the road in which the vehicle M is driving may be "3", the road edge 501 of the road may be on the right of the third lane, and a traffic divider may be located on the left side of the first lane.

Through the forward image information, the vehicle M may detect the left lane line LL of the driving lane (third lane) corresponding to a dashed line (a lane line having the property of allowing lane changes) and the right lane line RL of the driving lane corresponding to a solid line (a lane line having the property of prohibiting lane changes).

Further, when the distance d1 to the road edge between the right lane line RL and the road edge 501 of the road is equal to a predetermined distance or less, the vehicle M may determine that the driving lane corresponds to the outermost lane of the road.

Then, when the link information of the road included in the map information indicates that there is a road branching section within a predetermined distance ahead of the vehicle M, the vehicle M may determine that the vehicle has entered the road branching section after moving the predetermined distance.

Then, the vehicle M may determine whether the lane line of the branching road is misidentified as a right lane line of the driving lane according to whether the difference between the sensed curvatures of the left lane line LL and the right lane line RL exceeds the threshold value based on the forward image information.

When the difference between the sensed curvatures for each of the left lane line LL and the right lane line RL exceeds the threshold value, the vehicle M' may determine that the lane lines of the driving lane are misidentified and perform steering control only through the sensed curvature of the left lane line LL, of the lane lines on both sides, located opposite the branching road (in the direction x' opposite the direction x in which the branching road is located).

When the difference between the sensed curvatures for each of the left lane line LL and the right lane line RL is less than the threshold value, the vehicle M may determine whether the sensed curvature of the driving lane differs from the map curvature of the driving lane by the predetermined value or more.

The vehicle M' may perform steering control based on the map curvature of the driving lane when the sensed curvature of the driving lane differs from the map curvature of the driving lane by the predetermined value or more and may perform steering control based on the sensed curvature of the driving lane when the sensed curvature of the driving lane differs from the map curvature of the driving lane by less than the predetermined value.

Then, when the link information of the road included in the map information indicates that there is no road branching section within a predetermined distance ahead of the vehicle M″ or when the current measured value of the road edge distance d2 differs from the average value of the distance d1 to the road edge measured before entering the road branching section by a predetermined value or less, the vehicle M″ may determine that the vehicle has passed the exit point B of the road branching section.

Figure 3:
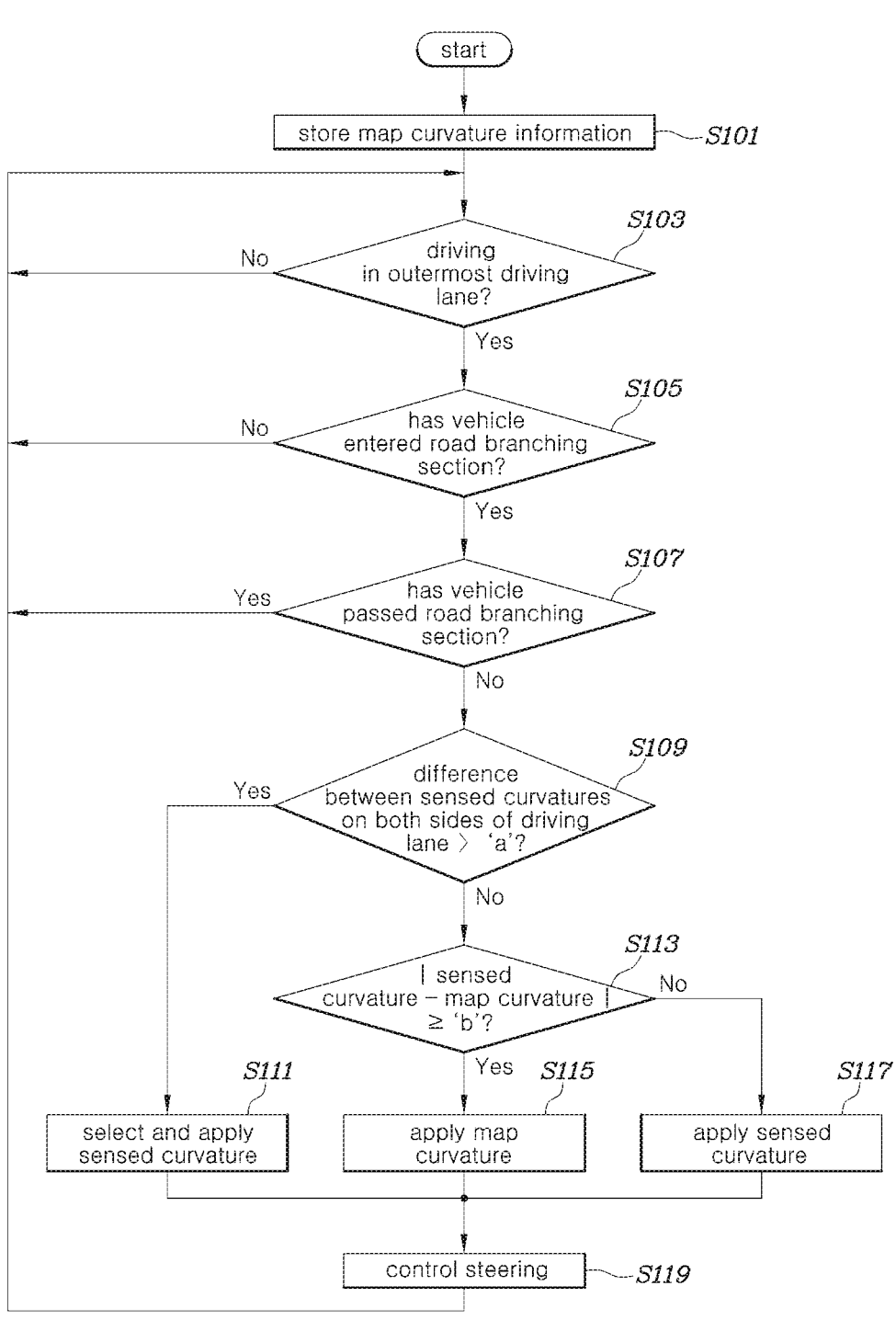
FIG. 3 is a flowchart describing a control method of a vehicle according to an embodiment of the present disclosure.

FIG. 3 is a flowchart describing a control method of a vehicle according to an embodiment of the present disclosure.

FIG. 3 shows that the curvature adjustment unit 440 may store in the buffer the information about the map curvature included in the map information to reduce delay time caused by converting the sensed curvature of the driving lane applied to the steering control curvature into the map curvature (S101).

The road branching section determination unit 430 may determine whether the vehicle is driving in the road branching section (S103, S105, S107).

More specifically, the road branching section determination unit 430 may determine whether the driving lane is the outermost driving lane of the road according to whether the road edge distance between the lane line, of the lane lines on both sides of the driving lane, having the property of prohibiting lane changes and the road edge of the road is equal to a predetermined distance or less (S103).

When it is determined that the driving lane is the outermost lane (YES in S103), the road branching section determination unit 430 may determine that the vehicle has entered the road branching section after moving a predetermined distance when the link information of the road included in the map information indicates that there is the road branching section within a predetermined distance ahead of the vehicle (S105).

When it is determined that the vehicle has entered the road branching section (YES in S105), the road branching section determination unit 430 may determine that the vehicle has passed the road branching section when the link information of the road included in the map information indicates that there is no road branching section within a predetermined distance ahead of the vehicle (S107).

Further, the road branching section determination unit 430 may measure the road edge distance after entering the road branching section and determine that the vehicle has passed the road branching section when the current measured value of the road edge distance differs from the average value of the road edge distance measured before entering the road branching section by a predetermined value or less (S107).

When it is determined that the vehicle is yet to pass the road branching section (NO in S107), the road branching section determination unit 430 may determine that the vehicle is driving in the road branching section.

When it is determined that the vehicle is driving in the road branching section, the curvature adjustment unit 440 may determine whether the lane line of the driving lane is misidentified according to whether the difference between the sensed curvatures for each of the lane lines on both sides of the driving lane according to the forward image information exceeds a/the threshold value 'a' (S109).

When the difference between the sensed curvatures for each of the lane lines on both sides of the driving lane exceeds the threshold value 'a' (YES in S109), the curvature adjustment unit 440 may select the sensed curvature for either one of the lane lines on both sides of the driving lane and apply the selected sensed curvature to the steering control curvature (S111). As described above, the curvature adjustment unit 440 may select the sensed curvature for the lane line located opposite the branching road among the lane lines on both sides of the driving lane.

When the difference between the sensed curvatures for each of the lane lines on both sides of the driving lane is equal to the threshold value 'a' or less (NO in S109), the curvature adjustment unit 440 may compare the sensed curvature of the driving lane with the map curvature of the driving lane (S113) and apply the sensed curvature or the map curvature to the steering control curvature based on the comparison result (S115, S117).

More specifically, the curvature adjustment unit 440 may determine whether the sensed curvature of the driving lane differs from the map curvature of the driving lane by a predetermined value 'b' or more (S113).

When the sensed curvature of the driving lane differs from the map curvature of the driving lane by the predetermined value 'b' or more (YES in S113), the curvature adjustment unit 440 may convert the sensed curvature of the driving lane applied to the steering control curvature into the map curvature (S115). As described above, the curvature adjustment unit 440 may convert the sensed curvature applied to the steering control curvature under the limit of predetermined curvature change rate into the map curvature and apply the map curvature stored in the buffer in S101 (that is, before the vehicle enters the road branching section) to the steering control curvature.

When the sensed curvature of the driving lane differs from the map curvature by the predetermined value 'b' or less, the curvature adjustment unit 440 may apply the sensed curvature to the steering control curvature (S117).

The steering control device 300 may perform steering control (S119) by adjusting the rotation angle of the steering wheel and the like based on the steering control curvature applied in S111, S115, or S117.

The present disclosure described above can be implemented as a computer-readable code on a medium on which a program is recorded. The computer-readable medium includes all types of recording devices in which data that can be read by a computer system is stored. Examples of computer-readable media are a hard disk drive (HDD), a solid state disk (SSD), a silicon disk drive (SDD), ROM, RAM, CD-ROM, a magnetic tape, a floppy disk, an optical data storage device, and the like. Accordingly, the above-detailed description should not be construed as limiting in all aspects and should be considered illustrative. The scope of the disclosure is to be determined by the reasonable interpretation of the appended claims, and all changes within the equivalents of the present disclosure are included in the scope of the present disclosure.

A vehicle control method may include determining whether the vehicle is driving in a predetermined section, comparing a sensed curvature of a driving lane measured through forward image information with the map curvature of the driving lane included in the map information when the vehicle is driving in a predetermined section, and applying the sensed curvature or the map curvature to steering control curvature based on the comparison result.

Further, as a device to resolve the technical issues described above, a vehicle may include a camera that outputs forward image information, a navigation system that outputs map information, and a controller that determines whether the vehicle is driving in a predetermined section, compares the sensed curvature of the driving lane measured through the forward image information with the map curvature of the driving lane included in the map information when the vehicle is driving in the predetermined section, and applies either the sensed curvature or the map curvature to the steering control curvature based on the comparison result.

According to the present disclosure, malfunctions of steering control caused by the misidentification of lane lines may be prevented by determining whether the lane lines of a driving lane are misidentified based on the sed curvature of the driving lane measured through forward image information and the map curvature of the driving lane included in the map information and adjusting steering control curvatures based on the determination.

The effects obtainable from the present disclosure are not limited to the effects mentioned above, and other effects not mentioned will be clearly understood by those skilled in the art to which the present disclosure pertains.

What is claimed is:

1. A method of controlling a vehicle, the method comprising:

determining whether the vehicle is being driven in a predetermined section of a road;

outputting forward image information by a camera;

comparing a sensed curvature on a driving lane measured through the forward image information with a map curvature of the driving lane included in map information of a navigation system while the vehicle is in the predetermined section; and applying the sensed curvature or the map curvature to a steering control curvature based on the comparison result, wherein the predetermined section corresponds to a road branching section, wherein the method further comprises determining whether the vehicle is being driven in the road branching section, wherein the determining of whether the vehicle is being driven in the road branching section includes:

determining whether the driving lane is an outermost lane of the road;

determining whether the vehicle has entered the road branching section in response to the determination that the driving lane is the outermost lane;

determining whether the vehicle has passed the road branching section in response to the vehicle entering the road branching section, and wherein the determining of whether the vehicle has passed the road branching section includes:

measuring road edge distance between the lane line having the property of prohibiting lane changes and the road edge of the road, and determining that the vehicle has passed the road branching section in response to the current measurement value of the road edge distance differing from the average value of the road edge distance measured before entering the road branching section by a predetermined value or less.

2. The method of claim 1, wherein the applying includes:

applying the map curvature to a steering control curvature in response to the sensed curvature differing from the map curvature by a predetermined value or more; and applying the sensed curvature to the steering control curvature in response to the sensed curvature differing from the map curvature by less than the predetermined value.

3. The method of claim 2, wherein the applying of the map curvature comprises converting the sensed curvature applied to the steering control curvature under the limit of predetermined curvature change rate into the map curvature.

4. The method of claim 2, wherein the applying of the map curvature is performed to apply the map curvature stored in a buffer before the vehicle enters the predetermined section to the steering control curvature.

5. The method of claim 1, further comprising:

determining whether the difference between sensed curvatures for each of lane lines on both sides of the driving lane exceeds a threshold value in response to the vehicle being driven in the predetermined section, wherein the comparing is performed in response to the difference between the sensed curvatures being equal to the threshold value or less.

6. The method of claim 5, further comprising:

selecting and applying the sensed curvature for either one of the lane lines on both sides of the driving lane to the steering control curvature in response to the difference between the sensed curvatures exceeding the threshold value.

7. The method of claim 6, wherein the predetermined section corresponds to a road branching section, and wherein the selecting and applying include selecting the sensed curvature for the lane line located opposite a branching road among the lane lines on both sides of the road branching section.

8. A non-transitory computer-readable recording medium having recorded thereon at least one program comprising commands, which, when executed by a computer, performs a method of controlling a vehicle according to claim 1.

9. The method of claim 1, wherein the determining of whether the driving lane is the outermost driving lane includes:

determining whether either one lane line of the lane lines on both sides of the driving lane has a property of prohibiting lane changes;

measuring road edge distance between the lane line having the property of prohibiting lane changes and a road edge of the road; and determining whether the driving lane is the outermost driving lane in response to the road edge distance being equal to a predetermined distance.

10. The method of claim 9, wherein different predetermined distances apply according to a road-type of the road.

11. The method of claim 1, wherein the determining of whether the vehicle has entered the road branching section includes:

determining whether the vehicle has entered a road branching section after moving a predetermined distance in response to the link information of the road included in the map information indicating that there is a road branching section within the predetermined distance ahead of the vehicle.

12. The method of claim 1, wherein the determining of whether the vehicle has passed the road branching section includes:

determining whether the vehicle has passed the road branching section in response to the link information of the road included in the map information indicating that there is no road branching section with a predetermined distance ahead of the vehicle.

13. A vehicle comprising:

a camera outputting forward image information;

a navigation system outputting map information; and a controller comprising a processor configured to:

determine whether the vehicle is being driven in a predetermined section of a road;

compare sensed curvature of a driving lane measured through the forward image information with a map curvature of the driving lane included in map information in response to the vehicle being driven in the predetermined section; and applying either the sensed curvature or the map curvature to a steering control curvature based on a comparison result, wherein the predetermined section corresponds to a road branching section, wherein the method further comprises determining whether the vehicle is being driven in the road branching section, wherein the determining of whether the vehicle is being driven in the road branching section includes:

determining whether the driving lane is an outermost lane of the road;

determining whether the vehicle has entered the road branching section in response to the determination that the driving lane is the outermost lane;

determining whether the vehicle has passed the road branching section in response to the vehicle entering the road branching section, and wherein the determining of whether the vehicle has passed the road branching section includes:

measuring road edge distance between the lane line having the property of prohibiting lane changes and the road edge of the road, and determining that the vehicle has passed the road branching section in response to the current measurement value of the road edge distance differing from the average value of the road edge distance measured before entering the road branching section by a predetermined value or less.

14. The vehicle of claim 13, wherein the processor is further configured to apply the map curvature to the steering control curvature in response to the sensed curvature differing from the map curvature by a predetermined value or more; and apply the sensed curvature to the steering control curvature in response to the sensed curvature differing from the map curvature by the predetermined value or less.

15. The vehicle of claim 13, wherein the processor is further configured to:

determine whether the difference between the sensed curvatures for each of the lane lines on both sides of the driving lane exceeds a threshold value in response to the vehicle being driven in the predetermined section; and compare the sensed curvature with the map curvature in response to the difference between the sensed curvatures being equal to the threshold value or less.

16. The vehicle of claim 15, wherein the processor is further configured to:

select the sensed curvature for either one of the lane lines on both sides of the driving lanes; and apply the selected sensed curvature to the steering control curvature in response to the difference between the sensed curvatures exceeding the threshold value.

17. The vehicle of claim 16, wherein the predetermined section corresponds to a road branching section, and wherein the processor is further configured to select the sensed curvature for the lane line located opposite the branching road among the lane lines on both sides in the road branching section.

18. The vehicle of claim 13, wherein the predetermined section corresponds to a road branching section, and wherein the processor is further configured to determine whether the vehicle is being driven in the road branching section by sequentially determining whether the driving lane is the outermost driving lane of the road, whether the vehicle has entered the road branching section, and whether the vehicle has passed the road branching section.

\* \* \* \* \*